July 17, 1934.  T. WALTERS  1,966,471
PAPER CUP MOLDING MACHINE
Filed Nov. 15, 1932    10 Sheets-Sheet 3
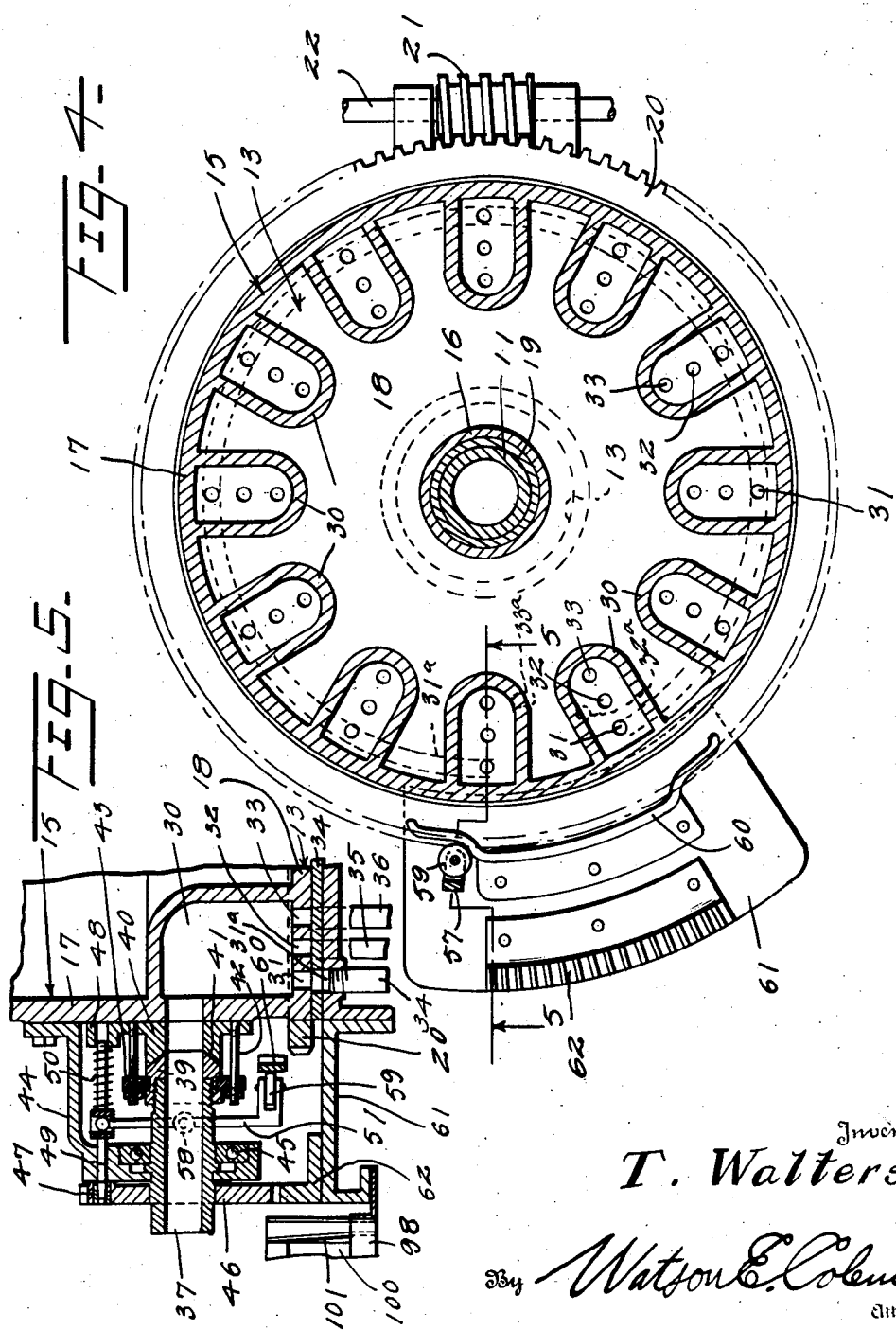
Inventor
T. Walters
By Watson E. Coleman
Attorney

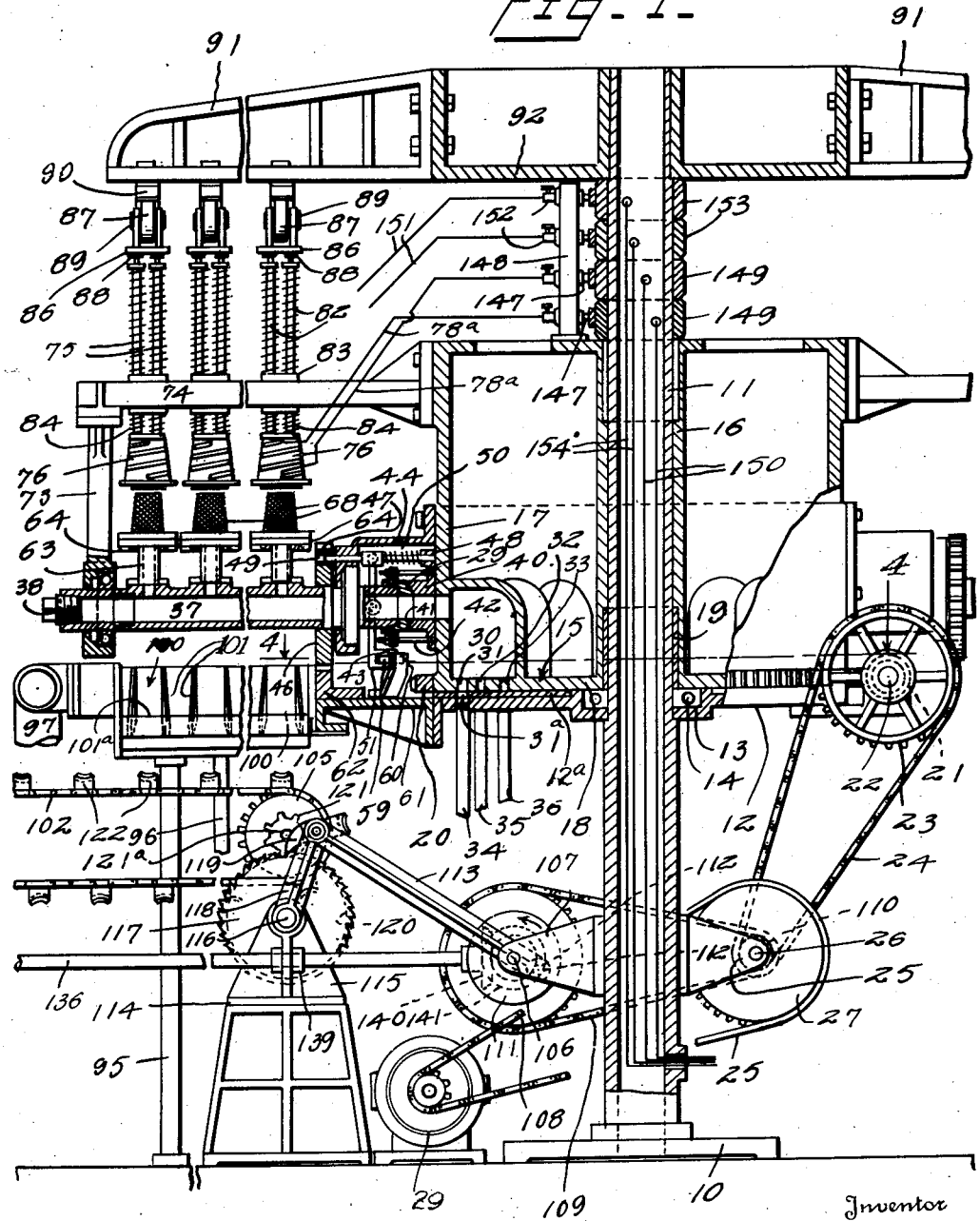

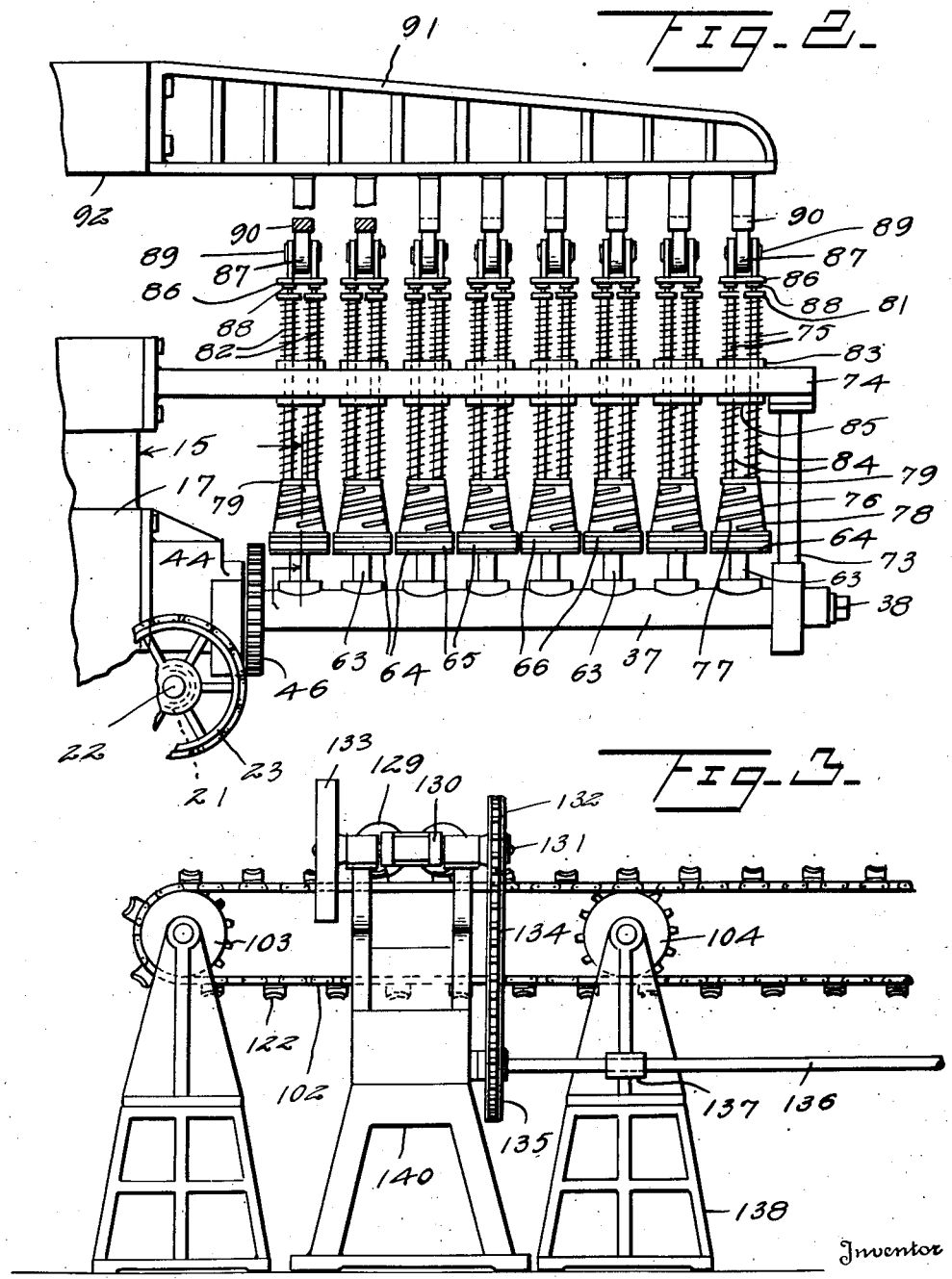

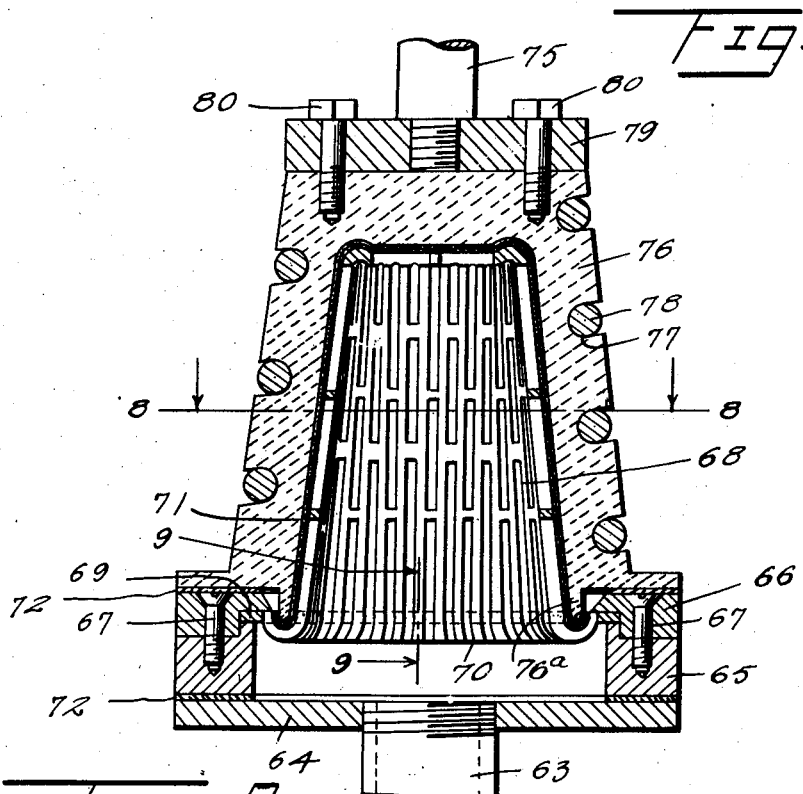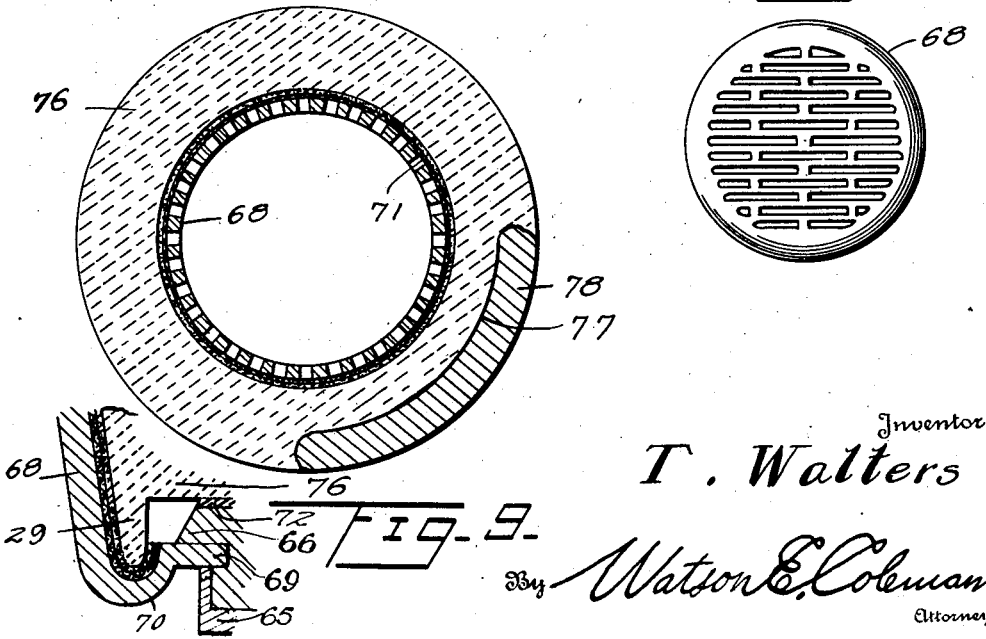

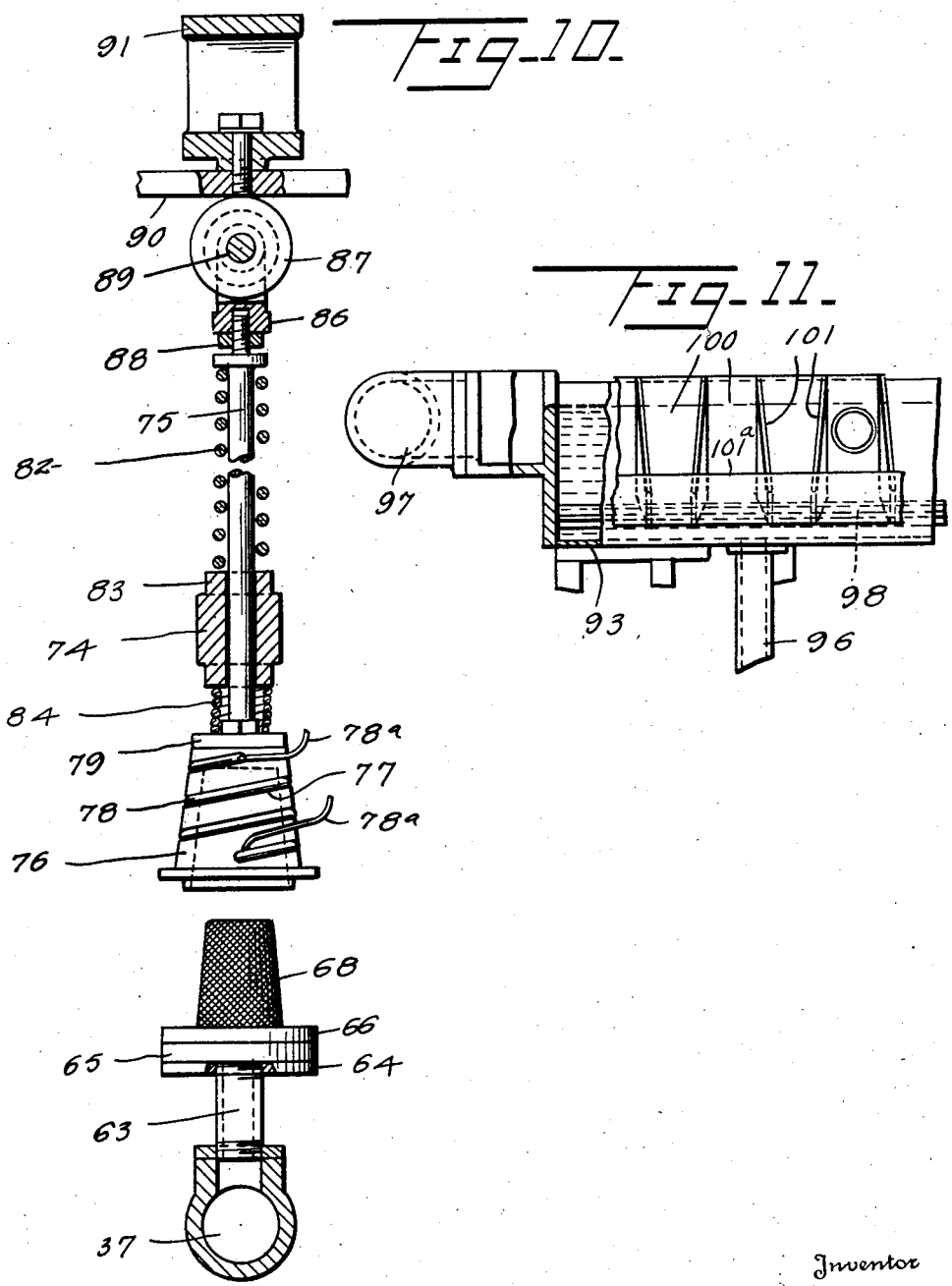

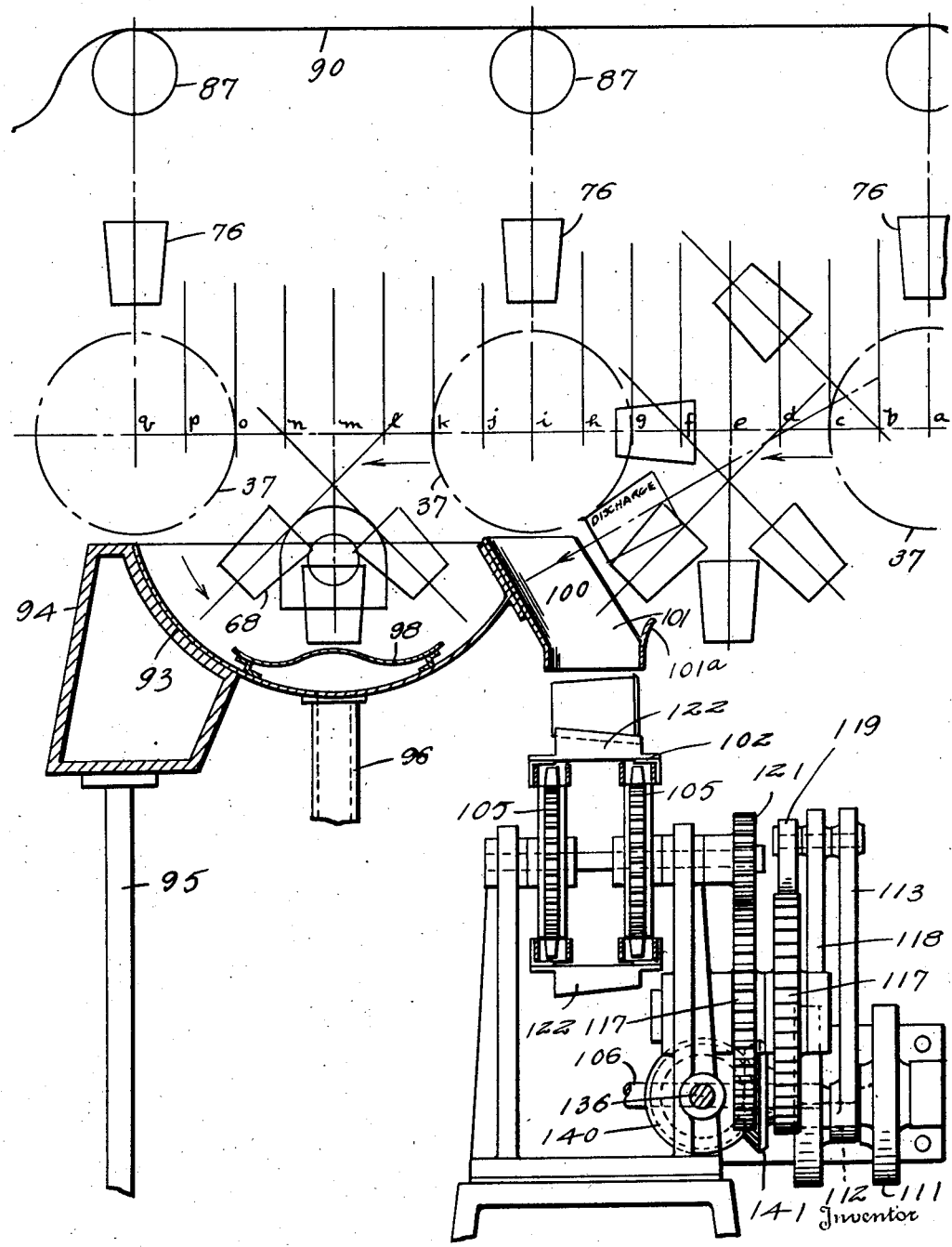

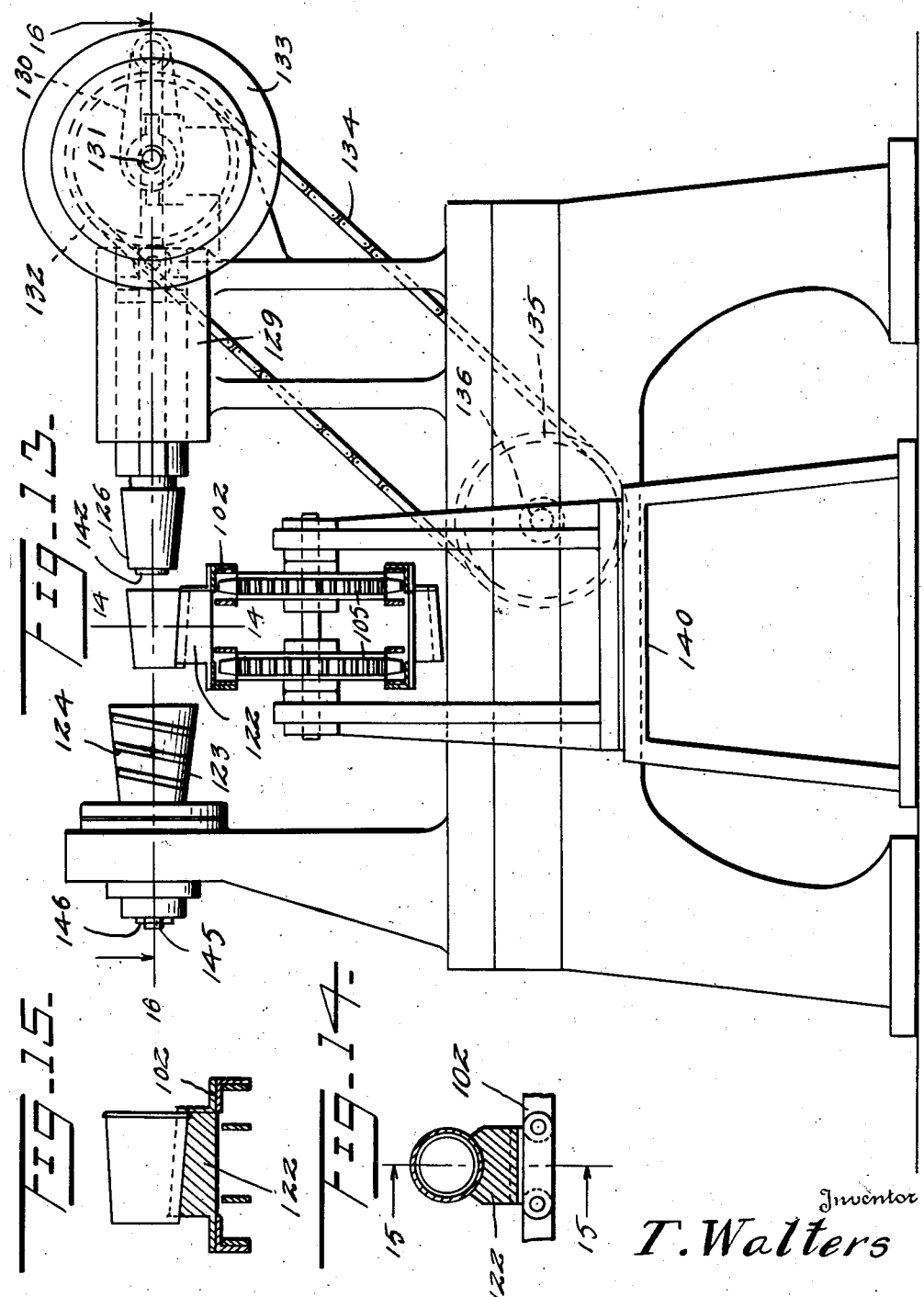

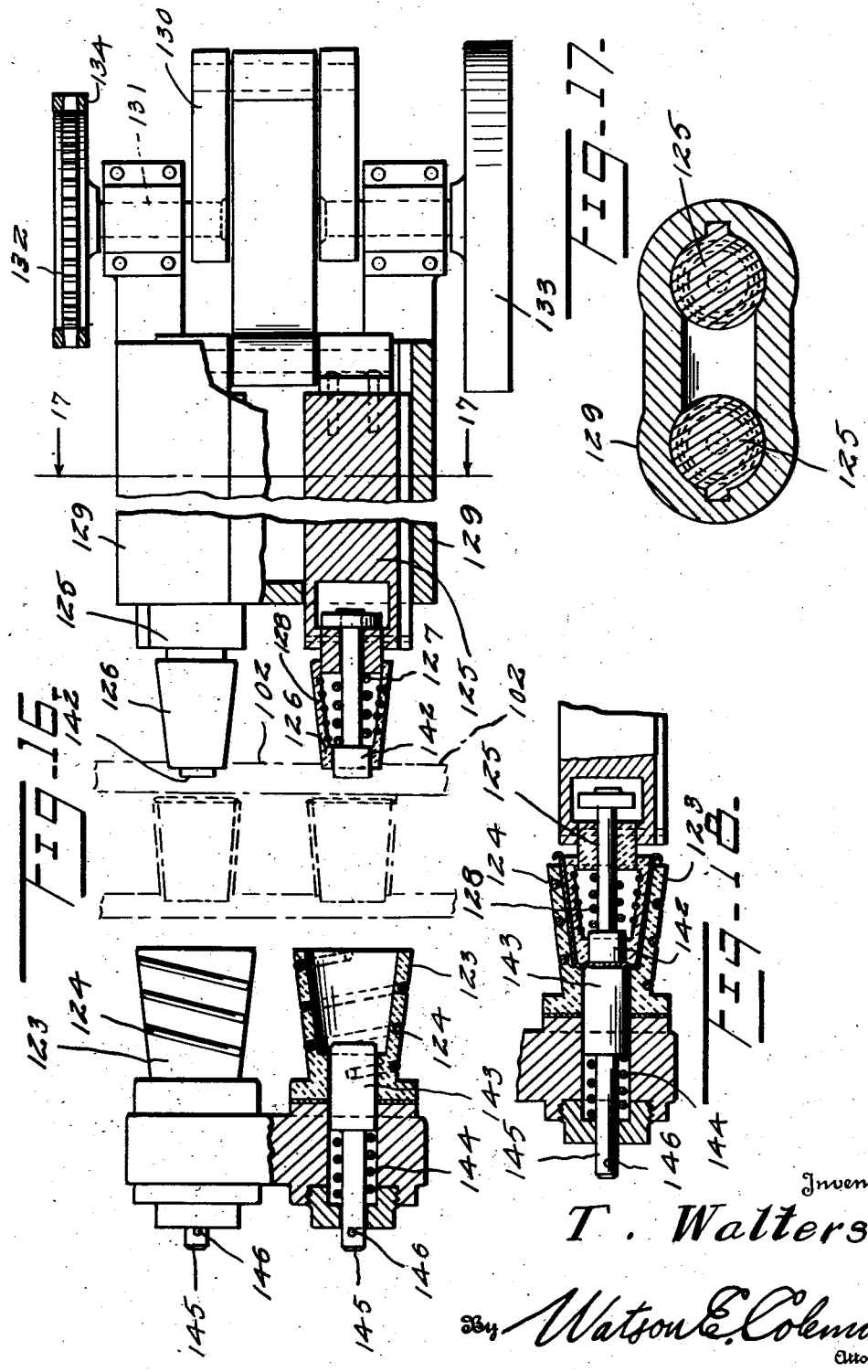

July 17, 1934. T. WALTERS 1,966,471
PAPER CUP MOLDING MACHINE
Filed Nov. 15, 1932 10 Sheets-Sheet 9
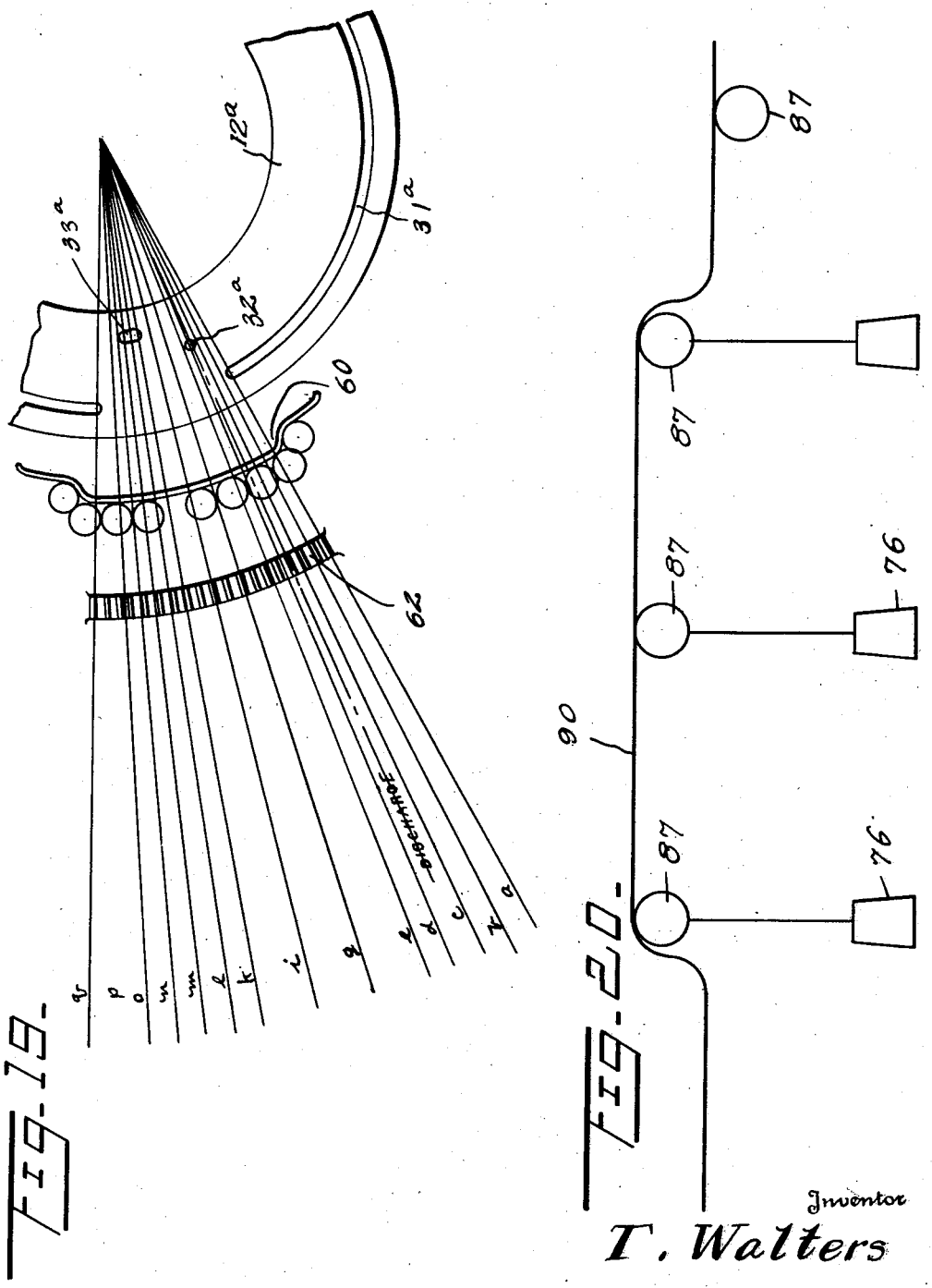
Inventor
T. Walters
By Watson E. Coleman

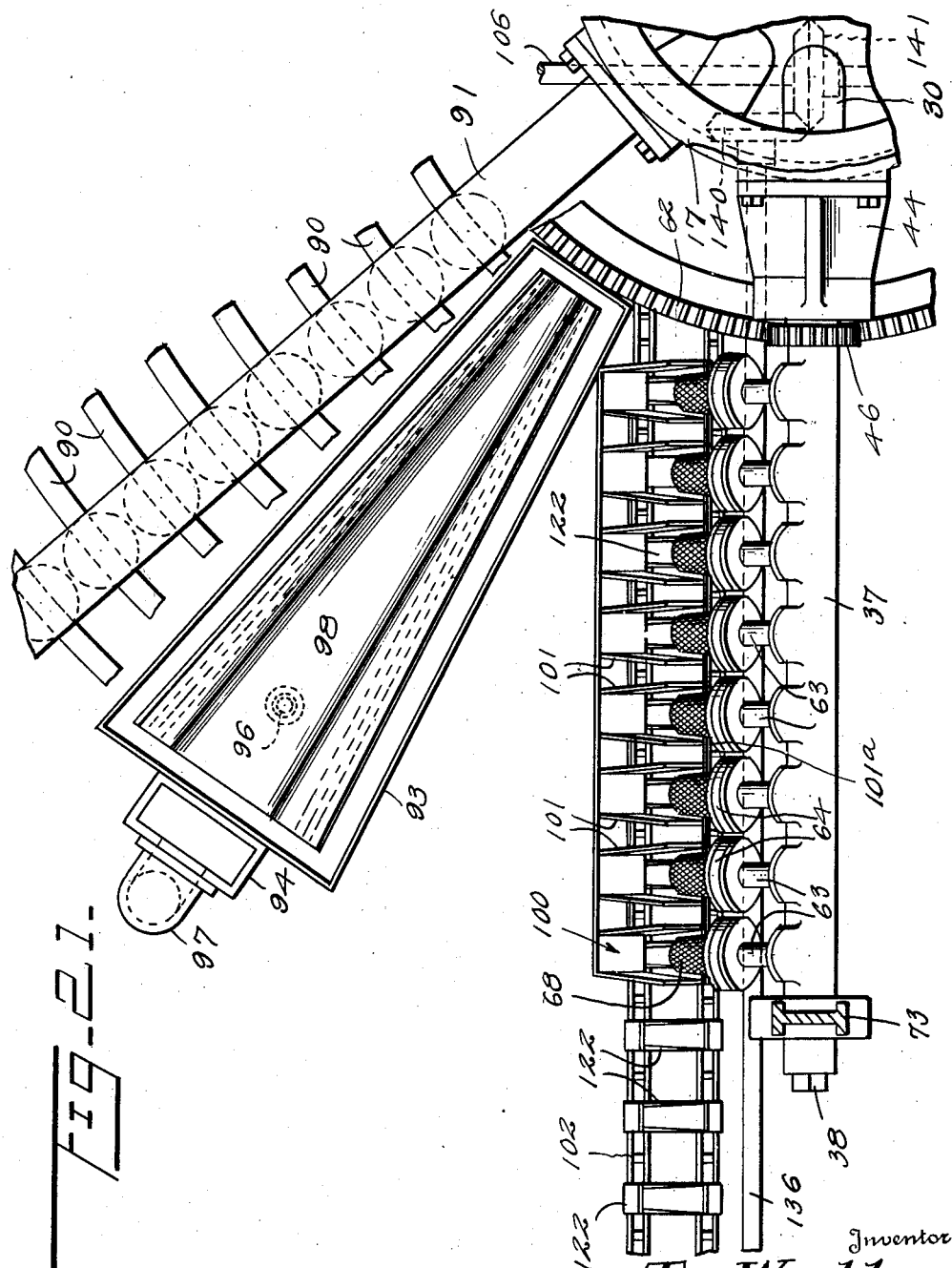

Patented July 17, 1934

1,966,471

UNITED STATES PATENT OFFICE 1,966,471

PAPER CUP MOLDING MACHINE

Theodore Walters, Kintnersville, Pa., assignor to George W. Swift Jr. Inc., Bordentown, N. J., a corporation of New Jersey Application November 15, 1932, Serial No. 642,811

14 Claims. (Cl. 92—57)

This invention relates to devices for forming paper drinking cups and the like and particularly to a machine for forming seamless paper cups out of paper pulp. One of the objects of this invention is to provide a mechanism of this character which is particularly effective and which is entirely automatic in its action and a further object is to provide a mechanism of this character which will not cause the cup to show any wire marks or other blemishes.

Another object in this connection is to provide a device of this character which will finish the cup and give it a smooth press-heated surface.

A further object is to provide a mechanism of this character which involves means for dipping an open-work form into a pulp tank to gather pulp upon the form, bringing the form in position below a press head having the form of a cup, depressing the press head around the cup, heating the press head so that the moisture is evaporated from the pulp upon the form and withdrawing this moisture, while the form and press head are traveling through a segment of a circle, then releasing the press head, inverting and discharging the cup by air from the form, guiding the cup upon a seat, submitting the cup to a further pressing action to completely form and smooth the interior and exterior of the cup and then discharging the completed cup.

A further object is to provide a machine of this character which is entirely automatic and requires no manual assistance other than to see that the machine is properly adjusted and in proper repair.

A still further object is to provide a machine of this character in which a plurality of arms are mounted upon a rotatable element rotating in a horizontal plane, the arms carrying a plurality of cup forms, provide means whereby these arms may be rotated around their own axis to carry the cup form into the pulp trough or tank, then bring the pulp form with its covering of pulp into position beneath a plurality of heated press heads and depressing said heads and holding them depressed while the completed arm is traveling through a segment of a circle, then releasing a completed cup by a blast of air and discharging it for further treatment as heretofore stated.

Other objects will appear in the course of the following description.

My invention is illustrated in the accompanying drawings, wherein:—

Figure 1 is a fragmentary vertical sectional view through a cup forming machine constructed in accordance with my invention;

Figure 2 is a fragmentary elevation of the drum and one of the arms of the machine and one of the cam supporting arms showing the female dies depressed in engagement with the cup forms and cups;

Figure 3 is an elevation of a portion of the conveyor and the dies for giving a final pressure to the cups;

Figure 4 is a section on the line 4—4 of Figure 1;

Figure 5 is a section on the line 5—5 of Figure 4;

Figure 6 is a vertical sectional view through the cup form and the female die coacting therewith, the cup form being shown as coated with pulp;

Figure 7 is an end view of the body of the cup form;

Figure 8 is a section on the line 8—8 of Figure 6;

Figure 9 is a section on the line 9—9 of Figure 6;

Figure 10 is a section on the line 10—10 of Figure 1, the female die and the cup form being shown in elevation;

Figure 11 is a side view of the pulp tank partly broken away and showing in elevation the chutes for discharging the cups;

Figure 12 is a cross section through the pulp tank, the cup discharge chutes, and an elevation of the conveyor operating mechanism, the figure also showing diagrammatically the position of the arms and of the cup form as the arms move over the tank and discharge chute;

Figure 13 is an elevation of the mechanism for giving the final pressure to the cups, the conveyor being shown in section;

Figure 14 is a section on the line 14—14 of Figure 13;

Figure 15 is a section on the line 15—15 of Figure 14;

Figure 16 is a top plan view partly broken away and in section showing the dies for giving the final pressure to the cups and the actuator mechanism therefor;

Figure 17 is a section on the line 17—17 of Figure 16;

Figure 18 is a longitudinal sectional view through the male and female dies of Figure 16, showing the dies closed and the cup being compressed;

Figure 19 is a diagrammatic plan view illustrating the position of the gear segment and of the cam for releasing the arm with relation to the different positions of the arm, this view also illustrating the position of the several ports in the base plate of the machine;

Figure 20 is a diagrammatic view illustrating the operation of the cam used in depressing or raising the vertical series of female dies;

Figure 21 is a fragmentary top plan view showing the chutes, the vat and the cam tracks in position to discharge into the chutes.

Referring to these drawings, 10 designates a base from which extends an upstanding tubular support 11. Mounted upon the tubular support and held against rotation is a disk 12 which is recessed at 13 to accommodate the ball bearings designated generally 14 which support a hollow drum 15. This drum 15 has an inner wall 16 concentric to the hollow standard 11, an outer wall 17 likewise concentric to the standard and a lower wall 18. Bearings 19 of any suitable character may be disposed between the inner wall 16 and the standard 11 and the drum rests on the ball bearings 14 so that this drum may be rotated around the fixed standard. To this end the lower wall 18 of the drum is provided with a gear ring 20. This gear ring is engaged by a worm 21 carried by a shaft 22 upon which is mounted the sprocket wheel 23. A sprocket chain 24 extends down over a sprocket wheel 25 carried by a shaft 26 in turn carrying a large sprocket wheel 27 driven by a sprocket chain 28 from the shaft of a motor designated generally 29. The motor has 728 R. P. M. while the shaft 26 rotates at 288 R. P. M. and the drum 15 rotates at the rate of 1 R. P. M. Of course, I do not wish to be limited to the particular gearing which I have provided for rotating the drum.

It is to be understood that a plurality of tubular arms extend from the drum, which arms may have any desired number, these arms communicating with the interior of the drum as will be later stated. The drum is provided with a plurality of chambers 30, one for each of these arms and the bottom wall 18 of the drum within each chamber 30 is formed with three ports 31, 32, and 33.

A brass plate 12a is disposed on the plate 12 at a certain portion of this plate and in passing over this portion of the plate 12, the lower wall 18 or bottom of the drum rests upon this brass plate 12a so as to have air-tight contact therewith, the contacting surfaces of walls 18 and plate 12a being ground. Corresponding apertures 31a, 32a, and 33a extend through the plate 12 and extending into these apertures are the three pipes 34, 35 and 36. The pipe 34 is connected to any suitable vacuum creating means as is the pipe 36 while the pipe 35 is connected to means for discharging a blast of air into the chamber 30. The port 33a as seen from Figure 19 is in the form of a relatively short slot. The port 32a which is laterally displaced with reference to the port 33a is a small circular port while the port 31a is in the form of a circularly extending slot which extends nearly entirely around the plate 12a and has its ends disposed in spaced relation as will be later explained and as shown in Figure 19. This slot 31a may be formed in the plate 12a and in the face of the plate 12 also or it may be formed entirely in the plate 12a. It is to be noted in this connection that the lower wall 18 of the drum bears against this gasket and has air-tight engagement therewith.

Extending from the drum are a plurality of radial arms 37 which are tubular and which rotate with the drum and rotate axially independently of the drum. The outer end of each arm is closed by a plug 38. The inner end of each arm has screw-threaded engagement with a terminal head 39, this head 39 being beveled on its end face. Mounted upon the wall 17 of the drum is a base member 40 having a beveled face 41 against which the beveled face of the head 39 bears, these beveled faces being ground so as to have a perfect fit.

Projecting from the base member 40 are the stud bolts 42 which engage a collar 43 which bears against the head 39 and thus holds this head and the tubular arm 37 in air-tight engagement with the ground joint face of the base 40. Also mounted upon the outer face of the drum in connection with each tubular arm 37 is a ball bearing housing and support designated 44 which extends outward and then downward and through which the tubular arm 37 passes. This housing supports within it the ball bearings designated generally 45 providing a rotative bearing for the arm 37. Mounted upon the arm 37 outward of the housing 44 is a gear wheel 46 having an aperture 47. Sliding in a guide form in the housing 44 and in a guide 48 carried by the base 40 is a locking pin 49 having a beveled extremity adapted to be forced into the aperture 47 to lock the gear wheel 46 from rotation and also lock the arm 37 from rotation. This pin 49 is urged outward by a compression spring 50 and is shiftable inward by means of a lever 51. This lever at its middle is mounted upon a supporting pin 58 projecting from the housing 44. The lever at its upper end has a ball joint connection to the pin 49 and at its lower end carries a roller 59 bearing against a cam 60 mounted upon a supporting bracket 61. This supporting bracket 61 and the cam are fixed from rotation with the drum and arms so that after a predetermined revolution of the drum, this roller 59 comes in contact with the cam 60, the lever 57 is moved outward at its lower end, retracting the pin 49 from the aperture 47. As soon as the roller 59 has passed the cam, however, the spring 50 will return the pin to its projected position.

Also mounted upon the bracket 61 is a short rack or gear segment 62 with which the gear wheel 46 engages immediately that the pin 49 is retracted from the opening 47 by the cam 60. When the gear wheel 46 comes into engagement with the segment 62, the hollow arm 37 is rotated through a complete rotation. The purpose of this will be later described.

Mounted upon each hollow arm 37 are a plurality of nipples 63 carrying upon them a plurality of cup forms. Each cup form consists of a porcelain base 64 having a circumferentially upstanding wall 65. Mounted upon this wall is a locking ring 66 held in place upon the wall 65 by means of the screw 67. Supported by this locking ring is a male mold or die 68 which is of open-work material and might be made of wire mesh but which is illustrated as being made of thin metal very finely slotted so as to provide a maximum of air openings across the sides and bottom, This is provided at its rim with an outwardly projecting flange or ring 69, the metal of the cup mold 68 being turned over to form a rim 70. Over this cup-shaped mold or die 68 there is disposed a layer of finely meshed wire designated generally 71. Porcelain washers 72 are disposed between the element 64 and clamping ring 65 and upon the upper face of the clamp ring 66. The clamp ring 66 extends beyond the wall 65 and over the outer face of the ring 69, thus clamping the ring 69 between the clamp ring 66 and the wall 65, holding this form or mold 68 in engagement with the base 64. This form or mold has the form of an inverted cup and it is upon these forms 68 that the pulp is gathered and pressed into shape.

Carried at the outer end of each arm 37 is an upright 73 and mounted upon the extremity of this upright and extending parallel to and above the arm 37 is a guide rod 74 which at its inner end is bolted or otherwise connected to the upper end of the drum 15.

Extending through this guide rod and guided for truly vertical motion therein are the pairs of plunger rods 75, there being a pair of these plunger rods for each of the cup forms. Each pair of plunger rods at its lower end carries a female mold or die designated generally 76 and formed of insulating material, the interior of each die conforming to the exact shape of the exterior of the cup to be formed. The die 76 has spiral grooves 77 within which are disposed convolutions of a heating coil 78 connected to a source of current so that these female dies are thus heated. The lower end of each die 76 is formed with a downwardly extending flange 76a adapted when the die is depressed against the cup form to bear against the gasket 72. Disposed upon the upper end of each die 76 is an insulating plate of porcelain or like material 79 and the plungers 75 are engaged with this plate, the plate being held to the die by means of the screws 80. The upper end of each plunger 75 is formed with a shoulder 81 and surrounding each plunger rod 75 is a coiled compression spring 82, the lower end of which bears against a seat 83 formed upon the guide bar 74. These springs urge the plunger upward. Surrounding the lower ends of the plunger rods 75 below the bars 74 are shock springs 84 which when the plunger rods are raised to their full extent as illustrated in Figure 1 are compressed against the under faces of seats 85 formed on the guide bars 74. These springs 84 simply take up the shock when the plungers are released and suddenly rise under the action of the springs 82. Adjustably mounted upon the upper ends of the plunger rods 75 are the brackets or supports 86 for the rollers 87, there being one roller for each pair of plunger rods. These supports 86 are vertically adjustable in any suitable manner as by means of the nuts 88.

The rollers 87 are mounted upon shafts 89 and each roller bears against a cam track 90, these cam tracks being mounted upon radially disposed supporting arms or brackets 91 carried by an annular cam track bracket support 92 mounted upon the upper end of the central standard 11. These cam tracks extend entirely around the machine and for an angular distance of approximately 330° the cams or cam tracks extend downward to their full extent and during this period will hold the female molds or dies 76 over and in engagement with the cups on the male dies. For a distance of approximately 30°, however, the under faces of the cam tracks are raised, as shown diagrammatically in Figure 20 so that during this period, the female dies are lifted from the male dies permitting under these circumstances, the rotation of the corresponding tubular arm 37 around its own axis. During the period when the female dies are held downward by the cam tracks 90, and while an arm is rotating through approximately 330°, the pulp on the male dies is being heated and dried. During the thirty degrees of movement when the female dies are lifted, the cups so formed are being discharged and pulp is being taken up upon the exterior faces of the cup forms or male dies 68.

It is to be understood that the first action in the formation of a cup is to cause the male dies or forms 68 to pass through a tank containing paper pulp so as to coat the exterior of the form with this paper pulp. The forms with the pulp coating are then raised to a position exactly beneath the female dies, the female dies are then lowered to compress the pulp, heat it, and drive off the moisture therein, this event occurring while the arms are rotating through 330° angular distance and then the female dies are raised and the arms which carry the cups inverted and the cups discharged.

For the purpose of coating the forms or molds 68 with paper pulp, I provide a tank or vat 93 which is supported by means of a supporting head 94 and supporting post 95, this vat preferably having a rounded bottom. This vat 93 has, of course, a length equal to that portion of each arm 37 which supports the cup forms 68. It is disposed immediately below and parallel to an arm 37 at the time when the gear wheel 46 meshes with the track 62. At one end of the depressed portion of the cam tracks 90, the female dies are raised by the springs 82 as before described and at the same instant, the gear wheel 46 comes in contact with the track 62 to cause one complete rotation of the particular tubular arm 37 which is above the track or gear segment 62. Thus this arm 37 is rotated from a position with the cups upright to a discharge position, the cups are then discharged by means hereafter to be described and then the cup forms 68 carried by the nipple 63 sweep through the tank 93 in the direction of the arrow in Figure 12. After the completed cup is discharged, the gear segment causes a second rotation of the tubular arm 47 which causes the forms 68 carried by the arm to sweep through the tank 93. While this is being done, the slotted port 33 is in communication with the vacuum pipe 36 so that the pulp is drawn against the wire mesh or reticulated form 68 and clings to the outside of this form so that when the form has passed out of the tank, it is completely covered or coated with paper pulp. The continued rotation of the arm 37 under the action of the gear wheel 46 and the segment gear 63 brings the cup forms with the pulp thereon into an upright position beneath the female dies 76 and as soon as this occurs, the rotation of the arm 37 around its own axis is stopped and the cam tracks 90 force the plungers with the female dies downward over the pulp on the cup forms 68 compressing the pulp and squeezing out the water therefrom.

This water passes through the apertures in the form 68 into the interior thereof and is drawn off by the drying vacuum pipe 34 through the slot 31 while the drum and the arms are rotating in a horizontal plane through 330°. Pulp is fed to the pulp tank by means of the pulp inlet pipe 96 and the overflow of the pulp passes out through the pulp overflow pipe 97. A stock baffle 98 extends longitudinally of the pulp tank. Disposed on the entering side of the pulp tank is a chute 100 having a length approximately co-extensive with the length of the arm 37 and formed with a plurality of guide ribs, walls or baffles 101, there being a pair of these guides or baffles beneath each cup. When in the course of travel of each arm 37, it comes to a position at the beginning of the gear segment 62 and at the end of the depressed portion of the cam tracks, gear 62 as previously stated causes a rotation of the arm 37 carrying the cup forms 68 with the cups thereon from a raised position to a position with the cups depending. As soon as the forms have reached a position where the forms extend downward and laterally toward the chute, the air discharge port 32a registers with the air discharge port 32 and air is discharged from the pipe 35 into the corresponding chamber 30 through the arm 37 and through the nipples 63 into the cup forms 68 and this air blows the completed cups off the forms on to the chute 100. The completed cups are then discharged from this chute downward on to an endless chain or carrier which at that moment is held from movement.

The endless chain is designated 102 and moves parallel to the lower edge of the chute 100. This chain is carried upon the sprocket wheels 103, 104, and 105. The sprocket wheels 103 and 104 are idle sprocket wheels and the sprocket wheel 105 is a driven sprocket wheel.

The means for giving a step by step movement to this sprocket wheel is as follows:—Mounted upon a shaft 106, which shaft is carried by the brackets 107 on the main standard, is a sprocket wheel 108 driven from the shaft 26 by a sprocket chain 109 trained over a sprocket wheel 110 on the shaft 26. The shaft 106 carries upon it a crank disk 111 carrying a crank pin 112 connected to a link 113. Mounted upon a pedestal 114 of any suitable character is the bearing 115 for a shaft 116, this shaft carrying loosely upon it a ratchet wheel 117 and the arm 118. This arm is pivotally connected to the link 113 and carries at its outer end the pawl 119 which engages with the teeth on the ratchet wheel 117. It will be obvious, therefore, that as the crank disk 111 revolves in the direction of the arrow Figure 1, the wheel 117 will be given a counter-clockwise rotation to an extent dependent upon the throw of the crank pin 112 and that upon a reverse movement of the crank pin 112, the pawl 119 will ride over the teeth on the ratchet wheel 117, thus allowing the wheel 117 to remain stationary. The shaft 116 carries upon it the gear wheel 120 which meshes with a gear wheel 121 carried on the shaft 121a upon which the driving sprocket wheel 105 is mounted. The shaft 106 is driven at the rate of 48 R. P. M. Mounted upon the sprocket chain 102 are a series of cup seats 122, these cup seats being spaced apart a distance equal to the discharge chutes defined by the baffle walls 101. The ratio of the gearing driving the sprocket chain is such with relation to the drive of the apparatus that when the partly finished cups are discharged from an arm into the chutes, cup seats 122 will be disposed immediately beneath each chute and the chain will be stationary. The endless chain 102 is given an intermittent step by step movement forward at such a speed that before the next arm 37 comes around to the discharge point or when it has come to this point, a second series of seats 122 are disposed beneath the chutes 100. Meanwhile the cups that have been discharged on to the seats 122 of the chain 102 are being carried forward and one by one given a final pressing and forming treatment by the means now to be described.

Disposed between the pairs of sprocket wheels 103 and 104 are a pair of female dies designated 123. These are disposed to one side of the path of movement of the chains 102 and have their interior shaped to fit the cups and these dies or forms are heated by means of the heating elements 124 which are disposed in a spiral connected to a source of current in any suitable manner. Disposed on the opposite side of the chain 102 but in alinement with the pairs of dies 123 are two plungers 125 each carrying upon it the male die 126. Each die is mounted upon the plunger 125 and encloses the coiled compression spring 127. These dies are heated by the heating elements 128. The plunger 125 operates through a guide 129 supported by a suitable pedestal and is reciprocated by a crank 130 mounted upon a shaft 131 which carries upon it the sprocket wheel 132, and the fly wheel 133. This shaft 131 is driven by means of the sprocket chain 134 passing over the sprocket wheel 132 passing around the sprocket wheel 135 mounted upon a shaft 136. This shaft extends parallel to the chain 102 and is supported in a bearing 137 carried by a pedestal 138 and by a bearing 139 carried by the pedestal 114. The extremity of this shaft carries upon it the beveled gear wheel 140 which engages a beveled gear wheel 141 mounted upon the shaft 106. The shaft 106 rotates at 48 R. P. M. as does the shaft 136 and this drives the shaft 131 at 48 R. P. M.

Thus as each seat 122 arrives in front of the plunger 126 and stops for the fraction of a moment, the plunger 125 is forced inward, the die 126 enters the cup and carries the cup into the female die 123 and gives the final compression to the cup, the heat of the two dies removing every possible trace of dampness and giving the cup a smooth, compact and polished surface. It will be seen that the plunger 125 has a head 142 which extends through the end of the male die 126. Projecting into the base of the female die is a knock-out pin or plunger 143 urged outward by a spring 144, this plunger having a rearwardly projecting pin 145 from which a cotter pin 146 projects. With this construction when the male die 126 enters the female die 123, the plunger head 142 will engage the knock-out pin 143 and the springs 127 and 144 will be compressed. When the male die is retracted from the female die, these knock-out pins 143 and 142 will be projected by the respective springs, thus pushing the cup out of the female die 123 and off of the male die 126, thus completely disengaging the cup from these dies and permitting the cup to be discharged.

Figure 19 shows diagrammatically the plate 12a, the gear 62 and the protuberant portion of the cam 60, the gear 62 and the cam 60 being carried on the drum 17. This figure shows the position of the ports 32a and 33a with relation to each other and with relation to the ends of the circumferential elongated slot or port 31a. The gear 62 and cam 60 are assumed in this figure to be rotatable in the direction of the arrow. It will, therefore, be seen that as the chamber 30 reaches this portion of the plate 12a, port 31 of the chamber will pass off of the slot 31a and the port 32 will register with the port 32a and that at this point, the finished cups will be blown off by air discharged through port 32.

Then the chamber continues its travel so that eventually the port 33 comes over the port 33a and connects the chamber with the air evacuating means. At this instant, the nipples on the arms carry the cup forms through the pulp tank and during this action, air is exhausted from the interior of these cup forms and the pulp is drawn around the forms and against the wire body partly constituting these forms. Then when the cups have been carried to their upright position and engage with the dies 76, the port 31 will be in register with the port 31a, and during the remainder of the travel through approximately 330°, the cups on the cup forms will be subjected to the action of a vacuum to consolidate the pulp against the wire mesh or reticulated forms and to draw off the steam from the pulp. It is necessary from the time that the arm 37 reaches the point marked a on the diagram to the time when the arm reaches the point q that the arm 37 shall be unlocked from the gear wheel 46 and this is secured by the action of the cam 60 which engages the roller 59 and throws the pin 49 out of the aperture 47 in the gear wheel, unlocking the gear wheel and the arm 37 to cause the rotation of the cup forms to bring the cup forms into exact coincidence with the dies 76. As soon as each arm 37 has reached the point q, this pin is projected and at the same time the gear wheel 46 leaves the gear segment 62.

The wires 78 from each of the female dies 76 are connected by wires 78a to a pair of brushes 147 mounted in a support 148 carried upon the drum 17. These brushes engage with a pair of collector rings 149 surrounding the central standard but insulated therefrom, unless the standard is of insulating material, and wires 150 engage these collector rings, extend out through the standard and out from the lower end thereof and connect to any suitable source of current. For the purpose of controlling the heat of the heating elements 78, a thermo-couple is provided in connection with one female die 76, the thermo-couple being connected by wires 151, to brushes 152, which bear against the collector rings 153, these collector rings being mounted upon the standard 11 as previously described and having wires 154 extending downward through the standard to any suitable control to keep all the molds and dies at one set temperature. It will be undestood, of course, that the heating coil 128 for the die 126 and the heating coil 124 for die 123 are also connected to a source of current and to suitable temperature controlling means. It is also to be noted that the male die or form 68 and the female die 76 are so formed that the cup is provided with an inwardly pressed bottom defined by an annular ridge or rib and that the margin of the cup is overturned to form a smooth and rounded rib.

The specific operation of the several parts has been described heretofore but it is desirable to restate briefly the general operation of the mechanism which is as follows:—

Under ordinary circumstances, there would be twelve of the arms 37 radiating from the drum 15 but any number of arms might be used. The drum is rotated at a constant speed, as for instance the speed of 1 R. P. M. As the arm nears a position above the tank 93, the arm is rotating in the direction of the arrow, Figure 12, while bodily moving in the direction of the arrow Figure 12.

This action causes the cup forms 68 to be dipped into the tank as the arm moves across over the tank and to be fully immersed into the pulp and then to be lifted out of the pulp. At this time, the vacuum port 33 is in register with the port 33a so that the interiors of the forms 68 are subjected to the action of the vacuum which draws the paper pulp against the exterior faces of the forms and covers these forms with a thin layer of paper pulp. The arm continues its movement away from the tank and at the same time the forms are lifted out of the tank to a vertical position. This occurs at the time when the gear wheel 46 has left its engagement with the gear segments 62 and simultaneously therewith the pin 49 is projected into engagement with the wheel 46, thus locking the cup forms extending upward to the position shown in Figure 1. During the period while the cup forms are being dipped in the tank and raised therefrom and lifted to a vertical position, the female dies 76 are raised but as soon as the cup forms have reached the vertical position shown in Figure 1, the female dies 76 are depressed by the cam tracks 90 and brought down tightly around the shell of pulp on the form 68, thus forming the cup and heating the pulp. Water evaporated by this heat passes through the cup forms into the interior thereof and is carried off through the slotted port 31. The cups are subjected to this drying action and to the pressure of the female dies 78 through approximately 330° and during this period, the forms are locked in their raised position by the pin 49 engaging the gear wheel 47. At this point, however, which is the point indicated by the letter a in Figures 18 and 19, the cam tracks 90 retreat, allowing the female dies 76 to lift off of the cups so as to release these cups and permit the rotation of the particular arm.

At the point a, the gear segment 62 and the cam 60 operate first to retract the pin 49 from the opening 47 and then to rotate the gear wheel 46 and the arm 37. When the center of the arm has reached the point d in Figure 12, the cups will be disposed downward and toward the chutes 100 and as soon as the port 32 registers with the port 32a, a blast of air will be discharged through the arm 17 and into the ends of the cups, discharge all of these cups carried by the arm on to the chutes 100, and these chutes with their guide ribs will cause the cups to move downward on to the seats 122 carried by the chain 102. The arm then moves on through the positions e, f, g, h, i until when the center of the arm is at the position l in Figure 12, the cups will start to be immersed within the tank. When the arm has reached the position n, the cups will have moved upward and eventually will be lifted from the tank and when the center of the arm has reached the position q, the cup forms will have been all raised to their vertical positions ready for the first pressing. As soon as the cups have been discharged upon the endless carrier 102, the carrier will move on step by step and before the next arm shall have arrived to discharge its cups, the carrier will have moved sufficiently to carry all of the eight previously formed cups beyond the chute 100. Meanwhile, these eight previously formed cups are being subjected two by two to the action of the pairs of plungers 126 and female dies 123 to complete the cups as previously described.

It will be seen that with this construction, every part of the machine including the final pressing means is synchronized in perfect time.

It is to be understood that at the instant the cup forms start to pass through the pulp tank, the wet vacuum port opens and the pulp is drawn against the wire on the cup forms by the vacuum, this vacuum drawing the water out of the pulp through the wire mesh on the cup forms, thereby letting pulp deposit on the outside of the wire, the water passing right on through the cup form and nipple and passing out through the arm and through the wet vacuum port 3. This wet vacuum port 3 is used only on the forming cycle and at this period the larger portion of the water is drawn out of the pulp so that when the cup is turned to the position shown in Figure 6 and inserted in the die 76, the remainder of the water in the cup is exhausted, this remainder of the water being turned, by reason of the heat in the die 76, into water vapor. Because of the fact that the inside surface of the female die is perfectly smooth, the steam is naturally drawn through the cup by the vacuum and by force of gravity, the male cup form being held in a vertical position during this drying cycle.

Preferably, the element 65 and clamping ring 66 will be separated from the base 64 (see Figure 6) by means of a porcelain washer 72 and a like washer will be used upon the face of the clamp 66, these washers acting to prevent the heat of the female die 76 from being transmitted to the cup form.

In actual practice, the machine will have twelve arms disposed 30° apart, each arm having eight or more molds or cup forms. By the mechanism which I have described, I eliminate all wire marks which previously marred molded pulp articles and secure a higher finish than was possible before. It is also possible with this process to make cups or other articles of relatively heavy stock or of very light stock due to the fact that the article is not taken off the forming mold until it is dry and completed. The result is a perfectly seamless one piece molded article which is, therefore, particularly sanitary. There is no warping of the articles. This is due to the fact that it is molded and dried in the same mold which has heretofore not been the case. Furthermore I find that by having the article when drying disposed in a vertical position with the mouth of the cup downward, it speeds up the drying process due to the fact that gravity acts upon the water to a certain extent as well as the vacuum. This machine turns out cups very readily and requires but little supervision.

I claim:

1. A method of making paper cups from paper pulp consisting in dipping an open-work form into the pulp while withdrawing air from the interior of the form, inserting the form and pulp gathered into a heated female die while exhausting air and water vapor from the interior of the form and thus forming and drying the cup and discharging the cup from the form and carrying the cup to heated coacting male and female dies, pressing the cup between these dies to give a final compression and finish to the cup, and remove the marks of the form from the interior of the cup and discharging it from said dies.

2. The method of making paper cups of paper pulp consisting in dipping an open-work cup form into the pulp while withdrawing air from the interior of the form to thus cause the pulp to gather thereon, inserting the form with its coating of pulp into a heated female die, pressing the form and die together for a predetermined length of time while exhausting the air and water vapor from the interior of the form and removing the form with the pressed cup from the female die and discharging air under pressure into the interior of the form to thus blow the pressed cup from the form, then carrying the pressed cup to heated coacting smooth faced male and female dies, pressing the cup between these dies to give a final compression and finish to the cup and to remove the marks of the open-work form from the interior of the cup and discharging the cup from said dies.

3. A paper cup forming mechanism including a fixed table, a tubular arm rotatable in a horizontal plane around a vertical axis and rotatable around its own longitudinal axis, a cup form of reticulated material carried on the arm, means for rotating the arm in a horizontal plane around the vertical axis, means for axially rotating the arm during a portion of its travel in the said horizontal plane, a pulp tank into which the form is immersed and through which the form passes as the arm is axially rotated, means whereby suction may be applied to the interior of the arm and form as the form passes through the tank to thus draw the pulp against the form, and means then acting to press the pulp against the form and withdraw air and water vapor from the interior of the form.

4. A paper cup forming machine including a tubular arm rotatable in a horizontal plane around a vertical axis and rotatable around its own longitudinal axis, a cup form of reticulated material disposed radially on the arm, means for rotating the arm in a horizontal plane around said vertical axis, means for axially rotating the arm during a portion of its travel around the vertical axis, a pulp tank into which the form is immersed and through which it passes as it is axially rotated, means whereby suction may be applied to the arm and form as the form passes through the tank to thus draw pulp against the exterior of the form, a heated female die, means for inserting the form with its coating of pulp into the die and holding it so inserted a predetermined time, means for withdrawing air from the interior of the form during this period of insertion to remove water vapor from the pulp, and means for discharging the cup on the form from the form when the cup has been sufficiently dried.

5. A paper cup forming machine including a tubular arm rotatable in a horizontal plane around a vertical axis and rotatable around its own longitudinal axis, a cup form of reticulated material disposed radially on the arm, means for rotating the arm in a horizontal plane around said vertical axis, means for axially rotating the arm during a portion of its travel around the vertical axis, a pulp tank into which the form is immersed and through which it passes as it is axially rotated, means whereby suction may be applied to the arm and form as the form passes through the tank to thus draw pulp against the exterior of the form, a heated female die, means for inserting the form with its coating of pulp into the die and holding it so inserted a predetermined time, means for withdrawing air from the interior of the form during this period of insertion to remove water vapor from the pulp, and means for forcing air under pressure into the interior of the form after the arm has moved a predetermined distance to thus force the cup off the form.

6. A paper cup forming machine including a tubular arm rotatable in a horizontal plane around a vertical axis and rotatable around its own longitudinal axis, a cup formed of recticulated material disposed radially on the arm, means for rotating the arm in a horizontal plane, means for axially rotating the arm during a portion of its travel in the said horizontal plane, a pulp tank into which the form is immersed and through which it passes as it is axially rotated, means whereby suction may be applied to the arm as the form passes through the tank to thus draw the pulp against the exterior of the form, a heated female die disposed adjacent the form and movable toward or from the form, means for forcing the female die over the form and against the coating of pulp thereon after the form has been lifted from the pulp tank, means for rotating the arm in a horizontal plane with the form disposed within the die and during this time withdrawing air and water vapor from the interior of the form to thus remove the water from the pulp, means then acting to lift the female die from the form, and means for discharging a blast of air into the interior of the form to blow the cup therefrom.

7. A paper cup forming machine including a tubular arm rotatable in a horizontal plane around a vertical axis and rotatable around its own longitudinal axis, a cup formed of reticulated material disposed radially on the arm, means for rotating the arm in a horizontal plane, means for axially rotating the arm during a portion of its travel in the said horizontal plane, a pulp tank into which the form is immersed and through which it passes as it is axially rotated, means whereby suction may be applied to the arm as the form passes through the tank to thus draw the pulp against the exterior of the form, a heated female die disposed adjacent the form and movable toward or from the form, means for forcing the female die over the form and against the coating of pulp thereon after the form has been lifted from the pulp tank, means for rotating the arm in a horizontal plane with the form disposed within the die and during this time withdrawing air and water vapor from the interior of the form to thus remove the water from the pulp, means then acting to lift the female die from the form, means for discharging a blast of air into the interior of the form to blow the cup therefrom, a chute into which the cup is received from the form, a conveyor on to which the cup is discharged with the cup disposed transversely of the conveyor, male and female dies disposed on each side of the conveyor, means for moving the male die into the cup and into the female die to thus cause a final compression and finishing of the cup, and means for opening the male and female dies to cause the discharge of the completed cup.

8. A paper cup forming machine including a fixed table, a central standard supporting the table, a drum rotatable upon the fixed table and around the standard, a tubular arm extending radially from the drum, the interior of the drum having a chamber communicating with the inner end of the tubular arm, the tubular arm being mounted upon the drum for axial rotation, a cup form disposed radially on said arm and formed of open-work material, a pulp tank disposed below the path of travel of the arm and into which the cup form may be immersed upon an axial rotation of the arm, a support carried by the drum and extending over and parallel to the arm, an electrically heated female die mounted upon said support for movement toward or from the arm, means urging said die away from the arm, a gear wheel mounted on the arm for rotating it, a segment gear mounted upon the table and with which the gear wheel engages at the moment when the arm is disposed above the tank to thus cause an axial rotation of the arm and the immersing of the form into the tank, a cam track supported upon a standard and acting upon the female die to depress it around the cup form when the arm has completed one axial rotation, said cam track being so formed as to hold the die in engagement with the cup form and the pulp thereon while the arm and drum make a predetermined rotation around the central standard, the table having a short slot communicating with a source of vacuum and the lower wall of the drum having a port adapted to communicate with said slot at the time when the form is being immersed in the tank, the table being formed with a long circumferentially extending slot communicating with a source of vacuum, the drum having a port communicating with this slot when the arm has made one complete rotation and the female die has been disposed over and in engagement with the form to thus withdraw water vapor from the interior of the form, the table having a port communicating with a source of air under pressure and the lower wall of the drum having a port registering with the last named port when the arm and drum have made nearly a complete rotation and the gear wheel has engaged said segment to axially rotate the arm whereby to blow the completed cup from the form.

9. A paper cup forming machine including a rotatable drum, a tubular radial arm rotatable with the drum, the inner end of the arm being mounted for axial rotation on the drum, radially projecting nipples disposed on said arm, a plurality of heated female dies, means holding said dies raised, a pulp tank disposed on a level below the arm and into which the forms on the arm are carried upon an axial rotation of the arm, a chute disposed on a level below the arm and to one side of the pulp tank, a gear wheel on the arm, a segment gear with which the gear wheel engages just before the arm comes to a position above the chute to thereby rotate the arm to carry the forms to a position over the chute, means locking the gear wheel from rotation as soon as the arm has been axially rotated to a position with the nipples extending upward in register with the female dies and the gear wheel has left the segment gear, a cam releasing said locking means as the arm reaches the position over the chute and the gear wheel engages said segment gear, said cam holding the locking means released until the gear wheel has been completely rotated by the segment gear, means acting to depress the dies over the forms as soon as the arm has rotated to a position with the forms extending upward after leaving the pulp tank, said means acting to hold the dies in engagement with the cup forms while the arm and drum are rotating to a position where the segment gear engages the gear wheel, said means then releasing the dies to permit them to move upward, means acting to discharge a blast of air through the tubular arm and forms when the arm has been rotated to a position with the forms directed toward the chute, means then acting to connect the tubular arm and the forms with a source of vacuum while the forms are being carried through the pulp tank by the rotation of said arm, and means then acting when the forms have been brought into register with the female dies to suck the air and water vapor from the interior of the forms during the period while the forms are in engagement with the dies.

10. A paper cup forming apparatus, a cup form of open-work material having an overturned rim and a flange projecting outward beyond the rim, a covering of reticulated material for said form, a support for the form having an annular flange, and a clamping ring engaged with said flange, the flange on the cup form being disposed between the clamping ring and the flange on the support, an electrically heated female die coacting with the form to press a layer of pulp thereon, the die having an annular portion extending into the overturned rim of the form when the die and form are brought together, means for forcing the die downward over the form, and means for simultaneously withdrawing air and water vapor from the interior of the form.

11. In a paper cup forming machine, a central standard, a drum rotatable upon the standard, the drum having a radial hollow inwardly beveled bearing member and an outwardly projecting fixed arm, a member depending from the outer end of the fixed arm and having a bearing, a tubular cup form carrying arm having its outer end rotatably mounted in said bearing, a conical bearing member carried on the inner end of this arm and inserted in the beveled bearing carried by the drum, and a sleeve carried by the drum and bearing against the conical bearing member, and means for drawing the sleeve toward the drum.

12. In a paper cup forming machine, a conveyor chain having seats for preformed cups, a heated female die disposed on one side of the path of movement of the chain, a knock-out pin at the bottom of said die, a spring projected knock-out pin through the bottom of the die, an opposed plunger disposed on the opposite side of the conveyor, means for reciprocating the plunger, the plunger including the male die movable to enter the cup and carry the cup into the female die, a spring projected knock-out pin disposed within the end of said die, and normally projecting beyond said end, and means for reciprocating said die.

13. In a paper cup forming machine, a vertical standard, a drum rotatable upon the standard and having a plurality of radially projecting tubular arms, each of said arms having radially projecting nipples, open work cup forms carried upon said nipples and projecting radially with relation to the arm, a plurality of rigid arms projecting from the drum above the first named drums, a plurality of plungers mounted upon the rigid arm and each carrying a heated female die at its lower end, springs urging said plungers upward above the forms, a plurality of arms carried upon the central standard above said plungers and carrying a plurality of cam tracks, one for each plunger, the cam tracks being adapted to depress and raise the plungers, a plurality of cup chutes disposed radially with relation to the central standard but below the level of said arms, a pulp tank disposed beyond the chutes and below the level of said arms, means for rotating the drum and arms around the central standard, means for causing an axial rotation of each arm as it arrives above the pulp tank to cause the forms to sweep through the pulp tank, means for withdrawing air from the interior of the forms as the forms sweep through the pulp tank to thus collect pulp upon the exterior of the forms, the circumferential series of cams acting to depress the female dies upon the forms when the forms have arrived in a vertical position and acting to hold the dies around the forms while the forms are rotating around the central standard to a position of cup discharge, means acting during this period for withdrawing air from the interior of the forms, means acting to rotate each arm as it arrives above the chutes to carry the forms into position immediately above the chutes, means acting at this instant to discharge air into the forms to discharge the cups therefrom into said chutes, an endless carrier mounted below the chutes and having cup seats, one for each chute, means for giving a step by step movement to the conveyor, a plurality of male and female dies arranged on opposite sides of the path of movement of the conveyor, means for reciprocating the male dies across the conveyor while the conveyor is stationary to carry the cups into the female dies, and means for discharging the cups from the male and female dies.

14. In a molding device of the character described, a vertical rotatable support, an arm extending horizontally from the support and rotatable around its own axis, a foraminous mold section carried radially on said arm, means for rotating said support around a vertical axis, means actuated by the rotation of said support for rotating said arm on its own horizontal axis through one revolution while the support is rotating through a predetermined arc, a second mold section with which the first named mold section is brought into alinement upon a completion of the rotation of said horizontal arm, means for locking said arm with its mold section in alinement with the second named mold section, and means actuated by the rotation of said support for depressing said second named mold section into engagement with the first named mold section while the supports and mold sections are rotating through a predetermined distance in a horizontal plane, and releasing engagement between the mold sections after the mold sections have been carried through this predetermined distance, and simultaneously releasing said locking means.

THEODORE WALTERS.